(12) United States Patent
Devers et al.

(10) Patent No.: US 7,981,828 B2
(45) Date of Patent: Jul. 19, 2011

(54) PROCESS FOR HYDRODESULPHURIZING GASOLINE CUTS CONTAINING SULPHUR AND OLEFINS IN THE PRESENCE OF A CATALYST COMPRISING AT LEAST ONE SUPPORT, ONE GROUP VIII AND ONE GROUP VIB ELEMENT

(75) Inventors: Elodie Devers, Lyons (FR); Christophe Bouchy, Lyons (FR); Nathalie Marchal-George, Saint-Génis-Laval (FR); Florent Picard, Communay (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 344 days.

(21) Appl. No.: 11/878,929

(22) Filed: Jul. 27, 2007

(65) Prior Publication Data
US 2008/0053872 A1  Mar. 6, 2008

(30) Foreign Application Priority Data
Jul. 28, 2006  (FR) ................... 06 07057

(51) Int. Cl.
*B01J 27/188* (2006.01)
*B01J 27/18* (2006.01)
*C10G 45/08* (2006.01)
(52) U.S. Cl. ........ 502/210; 502/208; 502/211; 502/213; 208/216 R; 208/217
(58) Field of Classification Search .............. 208/216 R, 208/217, 243, 244; 502/208, 210, 211, 213
See application file for complete search history.

(56) References Cited

U.S. PATENT DOCUMENTS

| 3,840,472 A | 10/1974 | Colgan et al. |
| 4,039,476 A | 8/1977 | Bertus et al. |
| 2004/0186013 A1 | 9/2004 | Iwata et al. |
| 2005/0261124 A1 | 11/2005 | Yoshimura et al. |

FOREIGN PATENT DOCUMENTS

| EP | 0 714 699 | 6/1996 |
| FR | 2 315 533 | 1/1977 |
| GB | 1 313 005 | 4/1973 |
| GB | 1514671 A | 6/1978 |

OTHER PUBLICATIONS

Partial Preliminary Search Report issued in FR 0607057 dated Feb. 22, 2007.

*Primary Examiner* — Walter D Griffin
*Assistant Examiner* — Renee Robinson
(74) *Attorney, Agent, or Firm* — Millen, White, Zelano & Branigan, P.C.

(57) ABSTRACT

The invention is about a catalyst comprising at least one support, at least one group VIII element, at least one group VIB element and phosphorus, in which the density of group VIB elements per unit surface area of the support is in the range (limits included) $2 \times 10^{-4}$ to $18 \times 10^{-4}$ of oxides of group VIB elements per $m^2$ of support, in which the molar ratio of phosphorus to the group VIB element is in the range 0.27 to 2.00, and in which the amount of group VIB elements is in the range (limits included) 1% to 20% by weight of oxides of group VIB elements and in which the support has a specific surface area of less than 135 $m^2/g$. The invention is also about a process for hydrodesulphurizing gasoline cuts containing sulphur and olefins in the presence of this catalyst.

36 Claims, No Drawings

PROCESS FOR HYDRODESULPHURIZING GASOLINE CUTS CONTAINING SULPHUR AND OLEFINS IN THE PRESENCE OF A CATALYST COMPRISING AT LEAST ONE SUPPORT, ONE GROUP VIII AND ONE GROUP VIB ELEMENT

The invention relates to a catalyst comprising at least one support, at least one group VIII element, at least one group VIB element and phosphorus, in which the density of group VIB elements per unit surface area of the support is in the range (limits included) in the range $2\times10^{-4}$ to $18\times10^{-4}$ grammes of group VIB element oxides per $m^2$ of support, in which the molar ratio of phosphorus to the group VIB element is 0.25 or more and in which the amount of group VIB elements is in the range (limits included) 1% to 20% by weight of group VIB element oxides. The invention also relates to a process for hydrodesulphurization of hydrocarbon feeds, preferably of the catalytic cracking gasoline type.

PRIOR ART

Gasoline cuts, more particularly gasoline from FCC, contain about 20% to 40% of olefinic compounds, 30% to 60% of aromatics and 20% to 50% of saturated paraffin or naphthene type compounds. Of the olefrnic compounds, branched olefins are in the majority compared with linear and cyclic olefins. Such gasolines also contain traces of highly unsaturated compounds of the diolefin type which are capable of deactivating catalysts by forming gums. Hence, European patent EP-B1-0 685 552 proposes selectively hydrogenating the diolefins, i.e. without transforming the olefins, before carrying out hydrotreatment to eliminate sulphur. The amount of sulphur-containing compounds in said gasoline is highly variable as a function of the type of gasoline (steam cracking, catalytic cracking, coking, etc) or, in the case of catalytic cracking, the severity of the process. It may fluctuate between 200 and 5000 ppm of S, preferably between 500 and 2000 ppm with respect to the mass of feed. Families of thiophenic and benzothiophenic compounds are in the majority, mercaptans only being present in very low quantities, generally in the range 10 to 100 ppm. FCC gasoline also contains nitrogen containing compounds in proportions which generally do not exceed 100 ppm.

The production of reformulated gasoline satisfying new environmental regulations necessitates that their concentration of olefins be reduced as little as possible to keep the octane number high, but their sulphur content must be substantially reduced. Current and future environmental regulations constrain refiners to reduce the sulphur content in gasoline to values of at most 50 ppm in 2005 and 10 ppm after 2010. Such regulations concern the total amount of sulphur, and also the nature of the sulphur-containing compounds such as mercaptans. Catalytically cracked gasoline, which may represent 30% to 50% of the gas pool, has high olefin and sulphur contents. The sulphur present in reformulated gasoline can be almost entirely attributed to FCC gasoline. Desulphurization (hydrodesulphurization) of gasoline, principally FCC gasoline, is thus of clear importance when meeting specifications. Hydrotreatment (or hydrodesulphurization) of catalytically cracked gasoline, when carried out under conventional conditions known to the skilled person, can reduce the sulphur content of the cut. However, that process has the major disadvantage of causing a very large drop in the octane number of the cut, because of the saturation of all of the olefins during hydrotreatment. Thus, processes have been proposed which allow FCC gasolines to be desulphurized while keeping the octane number high.

U.S. Pat. No. 5,318,690 proposes a process consisting of fractionating gasoline, sweetening the light fraction and hydrotreating the heavy fraction on a conventional catalyst, then treating it on a ZSM-5 zeolite to approximately regain the initial octane number.

International patent application WO-A-01/40409 claims the treatment of a FCC gasoline under conditions of a high temperature, low pressure and high hydrogen/feed ratio. Under those particular conditions, recombination reactions result in the formation of mercaptans, using the $H_2S$ formed by the desulphurization reaction, and the olefins are minimized.

Finally, U.S. Pat. No. 5,968,346 proposes a scheme which can reach very low residual sulphur contents by a multi-step process: hydrodesulphurization over a first catalyst, separation of the liquid and gas fractions, and a second hydrotreatment over a second catalyst. Liquid/gas separation can eliminate the $H_2S$ formed in the first reactor, to result in a better compromise between hydrodesulphurization and octane number loss.

Obtaining the desired reaction selectivity (ratio between hydrodesulphurization and olefin hydrogenation) can thus be partly due to the choice of process, but in all cases the use of an intrinsically selective catalytic system is usually a key factor.

In general, the catalysts used for this type of application are sulphide type catalysts containing a group VIB element (Cr, Mo, W) and a group VIII element (Fe, Ru, Os, Co, Rh, Ir, Pd, Ni, Pt). Thus, in U.S. Pat. No. 5,985,136, a catalyst is claimed which has a surface concentration in the range $0.5\times10^{-4}$ to $3\times10^{-4}$ g $MoO_3/m^2$ which can achieve high hydrodesulphurization selectivities (93% hydrodesulphurization (HDS) as opposed to 33% hydrogenation of olefins (HDO)). Further, in patents U.S. Pat. No. 4,140,626 and U.S. Pat. No. 4,774,220, it may be advantageous to add a dopant (alkali, alkaline-earth) to the conventional sulphide phase (CoMoS) to limit olefin hydrogenation.

A further pathway which can improve the intrinsic selectivity of catalysts is to draw benefit from the presence of carbon containing deposits on the catalyst surface. U.S. Pat. No. 4,149,965 proposes pre treating a conventional naphtha hydrotreatment catalyst to partially deactivate it before using it in gasoline hydrotreatment. Similarly, EP-A-0 745 660 indicates that pre treatment of a catalyst to deposit between 3% and 10% by weight of coke improves catalytic performances. In that case, it is stated that the C/H ratio must not be more than 0.7.

To improve selectivity, it is also possible to optimize the density of the group VIB oxide per square metre of support. Thus, US-A-2004/0007504 recommends surface densities in the range $4\times10^{-4}$ to $36\times10^{-4}$ grammes of group VIB element oxide per $m^2$ of support.

Further, another pathway which can improve the intrinsic selectivity of catalysts is to add phosphorus to the support. US-A1-2005/0261124 proposes adding phosphorus in proportions of 1% to 23% by weight of $P_2O_5$ with respect to the catalyst weight and in U.S. Pat. No. 6,746,598 B1, in proportions of 0.1% to 10%. Phosphorus is also used as a dopant for the hydrodesulphurization activity of hydrocarbon feeds, as illustrated in U.S. Pat. No. 4,880,525 or 5,246,569.

SUMMARY OF THE INVENTION

The present invention is directed towards a catalyst which can be used in a gasoline hydrodesulphurization process which can reduce the total sulphur and mercaptans contents in hydrocarbon cuts, preferably FCC gasoline cuts, without a large loss of gasoline and also minimizing the reduction in octane number.

The invention concerns a catalyst comprising at least one support, at least one group VIII element, at least one group VIB element and phosphorus, in which the density of group VIB elements per unit surface area of the support is (limits included) in the range $2\times10^{-4}$ to $18\times10^{-4}$ grammes of group VIB element oxides per m² of support, in which the molar ratio of phosphorus to the group VIB element is 0.25 or more and in which the amount of group VIB elements is in the range (limits included) 1% to 20% by weight of group VIB element oxides. The invention also concerns the process for hydrodesulphurization of hydrocarbon feeds, preferably of the fluid catalytic cracking gasoline type.

DETAILED DESCRIPTION OF THE INVENTION

The present invention is directed towards at obtaining a catalyst with a given activity and a given selectivity for their use in hydrotreatment processes. The activity and selectivity values are normalized by taking catalyst 1 in the examples (see table below) as a reference.

The method below is used to evaluate catalyst activity and selectivity: a model feed representative of a fluid catalytic cracking (FCC) gasoline containing a sulphur-containing compound and an olefin is used to evaluate the various catalysts which are initially sulphurized ex situ in the gas phase. The reaction is carried out in a closed Grignard type reactor. Samples are removed at various time intervals and are analyzed by gas chromatography to observe the disappearance of the reagents.

The activity is expressed as a rate constant $k_{HDS}$ of the hydrodesulphurization reaction (HDS), normalized for the volume of catalyst in the oxide form, assuming a first order reaction with respect to the sulphur-containing compounds. The selectivity is expressed as a normalized ratio of the rate constants, $k_{HDS}/k_{HDO}$, $k_{HDO}$ being the rate constant for the olefin hydrogenation reaction (HDO), normalized for the volume of catalyst in the oxide form, assuming a first order reaction with respect to the olefins.

All of the activity and selectivity values are normalized by taking catalyst 1 with the characteristics mentioned below as a reference and taking $k_{HDS}/k_{HDO}=100$ and $k_{HDS}=100$.

group VIB element oxides per m² of support, preferably in the range (limits included) $3\times10^{-4}$ to $16\times10^{-4}$ grammes of oxides of elements from group VIB per m² of support, more preferably in the range (limits included) $3\times10^{-4}$ to $14\times10^{-4}$ grammes of group VIB element oxides per m² of support, and more preferably in the range (limits included) $4\times10^{-4}$ to $13\times10^{-4}$ grammes of oxides of elements from group VIB per m² of support.

The amount of group VIB elements is preferably in the range (limits included) 1% to 20% by weight of group VIB element oxides, more preferably in the range (limits included) 1.5% to 18% by weight of group VIB element oxides, more preferably in the range (limits included) 2% to 15% by weight of group VIB element oxides, still more preferably in the range (limits included) 2.5% to 12% by weight of group VIB element oxides. Preferably, the group VIB element is molybdenum or tungsten or a mixture of said two elements; more preferably the group VIB element is solely constituted by molybdenum or tungsten. Highly preferably, the group VIB element is molybdenum.

The amount of group VIII elements in the catalyst of the invention is preferably in the range (limits included) 0.1% to 20% by weight of group VIII element oxides, preferably in the range (limits included) 0.2% to 10% by weight of group VIII element oxides, more preferably in the range (limits included) 0.3% to 5% by weight of group VIII element oxides. Preferably, the group VIII element is cobalt or nickel or a mixture of these two elements, and more preferably the group VIII element is constituted uniquely by cobalt and/or nickel. Highly preferably, the group VIII element is cobalt.

The molar ratio of group VIII elements to group VIB elements may be in the range (limits included) 0.1 to 0.8, preferably in the range (limits included) 0.2 to 0.6, and more preferably in the range (limits included) 0.3 to 0.5.

The phosphorus content is preferably in the range (limits included) 0.1% to 10% by weight of $P_2O_5$, more preferably in the range (limits included) 0.2% to 5% by weight of $P_2O_5$, still more preferably in the range (limits included) 0.3% to 4% by weight of $P_2O_5$, yet more preferably in the range (limits included) 0.35% to 3% by weight of $P_2O_5$.

The molar ratio of phosphorus to group VIB elements is 0.25 or more, preferably 0.27 or more, more preferably in the range (limits included) 0.27 to 2.00, more preferably in the range (limits included) 0.35 to 1.40, still more preferably in

| Catalyst | Density g $MoO_3/m^3$ | Wt % CoO | Wt % $MoO_3$ | Wt % $P_2O_5$ | P/Mo | S BET $m^2/g$ | $k_{HDS}/k_{HDO}$ | $k_{HDS}$ |
|---|---|---|---|---|---|---|---|---|
| 1 (reference) | $7.6 \times 10^{-4}$ | 2.9 | 10.3 | 0 | 0 | 135 | 100 | 100 |

The catalysts of the present invention have a selectivity ($k_{HDS}/k_{HDO}$, as a normalized value) of 110 or more, preferably 119 or more, more preferably 122 or more and still more preferably 127 or more.

The catalysts of the present invention have an activity ($k_{HDS}$, normalized value) of 71 or more, preferably 73 or more, more preferably 74 or more and still more preferably 82 or more.

The catalysts of the invention are catalysts comprising at least one support, at least one group VIII element, at least one group VIB element and phosphorus in which the density of the group VIB elements per unit surface area of the support is in the range (limits included) $2\times10^{-4}$ to $18\times10^{-4}$ grammes of the range (limits included) 0.45 to 1.10, yet still more preferably in the range (limits included) 0.45 to 1.00, or even in the range (limits included) 0.50 to 0.95.

The catalyst support may be a porous solid selected from the group constituted by: aluminas, silica, silica aluminas or oxides of titanium or magnesium, used alone or as a mixture with alumina or silica alumina. It is preferably selected from the group constituted by: silica, the family of transition aluminas and silica aluminas; highly preferably, the support is essentially constituted by at least one transition alumina, i.e. it comprises at least 51% by weight, preferably at least 60% by weight, more preferably at least 80% by weight or even at least 90% by weight of transition alumina. It may optionally be constituted solely by a transition alumina.

The specific surface area of the support of the invention may optionally be less than 200 m²/g, more preferably less than 170 m²/g, still more preferably less than 150 m²/g, yet more preferably less than 135 m²/g, or even less than 100 m²/g and even less than 85 m²/g. The support may be prepared using any precursor, any preparation method and any forming tool known to the skilled person.

The catalyst of the invention may be prepared using any technique which is known to the skilled person, especially by impregnating elements from groups VIII and VIB onto the selected support. Said impregnation may, for example, be carried out using the mode known to the skilled person as dry impregnation, in which precisely the desired quantity of elements is introduced into the selected solvent in the form of soluble salts, for example demineralized water, to fill the pores of the support as exactly as possible. The support filled with the solution is then preferably dried.

The phosphorus may be added at the same time as the metal salts during dry impregnation onto the support.

After introducing the group VIII and VIB elements, and optionally forming the catalyst, it undergoes an activation treatment. This treatment is generally intended to transform the molecular precursors of the elements into the oxide phase. In this case, it is an oxidizing treatment, but a direct reduction may also be carried out. In the case of an oxidizing treatment, also termed calcining, this is generally carried out in air or diluted oxygen and the treatment temperature is generally in the range 200° C. to 550° C., preferably in the range 300° C. to 500° C. In the case of a reducing treatment, this is generally carried out in pure hydrogen or, as is preferable, diluted hydrogen, and the treatment temperature is generally in the range 200° C. to 600° C., preferably in the range 300° C. to 500° C.

Examples of salts of groups VIB and VIII metals which may be used in the process of the invention are cobalt nitrate, nickel nitrate, ammonium heptamolybdate or ammonium metatungstate. Any other salt which is known to the skilled person with sufficient solubility which is decomposable during activation treatment may also be used.

The phosphorus may be added in the form of phosphoric acid.

The catalyst is normally used in a sulphurized form obtained after heat treatment in contact with an organic sulphur-containing compound which can be decomposed and generate $H_2S$, or directly in contact with a gaseous flux of $H_2S$ diluted in $H_2$. This step may be carried out in situ or ex situ (inside or outside the reactor) with respect to the hydrodesulphurization reactor, at temperatures in the range 200° C. to 600° C., more preferably in the range 300° C. to 500° C.

The catalyst of the invention may be used in any process which is known to the skilled person which can desulphurize hydrocarbon cuts, for example fluid catalytic cracking gasolines. It may be carried out in any type of reactor operated in fixed or moving or ebullated bed mode. However, it is preferably used in a reactor operated in fixed bed mode.

The feed to be hydrotreated (or hydrodesulphurized) using a process in accordance with the invention is generally a gasoline cut containing sulphur, such as a cut from a coking unit, visbreaking unit, steam cracking unit or fluid catalytic cracking unit. Said feed is preferably constituted by a gasoline cut from a fluid catalytic cracking unit with a boiling point range which is typically from the boiling points of hydrocarbons containing 5 carbon atoms to about 250° C. This gasoline may optionally be composed of a significant fraction of the gasoline from other production processes such as atmospheric distillation (gasoline from straight run distillation) or from conversion processes (coking or steam cracking).

By way of indication, the operating conditions for selective hydrodesulphurization of fluid catalytic cracking gasolines are a temperature in the range from about 200° C. to about 400° C., preferably in the range 250° C. to 350° C., a total pressure in the range 1 MPa to 3 MPa, more preferably in the range 1 MPa to about 2.5 MPa, with a ratio of the volume of hydrogen to the volume of hydrocarbon feed in the range 100 to 600 litres per litre and more preferably between 200 and 400 litres per litre. Finally, the hourly space velocity (HSV) is the inverse of the contact time expressed in hours. It is defined by the ratio of the volume flow rate of liquid hydrocarbon feed to the volume of catalyst charged into the reactor. It is generally in the range 1 $h^{-1}$ to 10 $h^{-1}$, preferably in the range 2 $h^{-1}$ to 8 $h^{-1}$.

EXAMPLES

Preparation of Catalysts

All of the catalysts were prepared using the same method, which consisted of dry impregnating an aqueous solution prepared from molybdenum oxide, cobalt hydroxide and phosphoric acid, the volume of the solution containing the precursors of the metals and phosphorus being rigorously equal to the pore volume of the support mass. The supports used were transition aluminas with (specific surface area, pore volume) parameter pairs of (135 m²/g, 1.12 cm³/g) or (81 m²/g, 1.08 cm³/g). The concentrations of the precursors in the aqueous solution were adjusted to deposit the desired weights on the support. The catalyst was then dried for 12 hours at 120° C. and calcined in air at 500° C. for 2 hours.

Evaluation of Catalytic Performances

In a first series of examples, a model feed representative of a fluid catalytic cracking (FCC) gasoline containing 10% by weight of 2,3-dimethylbut-2-ene and 0.33% by weight of 3-methylthiophene (i.e. 1000 ppm of sulphur with respect to feed) was used to evaluate the various catalysts. The solvent used was heptane. The catalysts were initially sulphurized ex situ in the gas phase at 500° C. for 2 h in a stream of $H_2S$ in $H_2$ (15%).

The reaction was carried out in a closed Grignard type reactor in 3.5 MPa of hydrogen pressure, at 250° C. Samples were removed at various time intervals and were analyzed by gas chromatography to observe the disappearance of the reagents.

The activity was expressed as the rate constant $k_{HDS}$ of the hydrodesulphurization reaction (HDS), normalized to the volume of catalyst in the oxide form, assuming the reaction to be first order with respect to the sulphur-containing compounds. The selectivity was expressed as the normalized ratio of the rate constants, $k_{HDS}/k_{HDO}$, $k_{HDO}$ being the rate constant for the olefin hydrogenation reaction (HDO), normalized to the volume of catalyst in the oxide form, assuming the reaction to be first order with respect to the olefins.

The values were normalized by taking catalyst 1 as the reference and taking $k_{HDS}/k_{HDO}=100$ and $k_{HDS}=100$.

In a second series of examples, a fluid catalytic cracking gasoline (FCC) with the characteristics shown in Table 1 was treated with various catalysts. The reaction was carried out by varying the temperature in a traversed bed type reactor under the following conditions:

P=1.5 MPa, $H_2$/feed=400 litres/litre of hydrocarbon feed, HSV=4 $h^{-1}$.

the temperature was varied (265° C. to 275° C.) to compare the selectivities obtained ($k_{HDS}/k_{HDO}$ ratio) at hydrodesulphurization iso-conversion, i.e. for a hydrodesulphurization conversion of about 94% for all of the catalysts.

The catalysts were initially treated at 350° C. with a feed containing 2% by weight of sulphur in the form of DMDS (dimethyldisulphide) to ensure sulphurization of the oxide phases. In all cases, analysis of the residual organic sulphur-containing compounds was carried out after eliminating the $H_2S$ deriving from decomposition. The effluents were analyzed by gas chromatography to determine the concentrations of hydrocarbons and by the method described in French standard NF M 07075 to determine the total sulphur.

The results are expressed as a ratio of the rate constant $k_{HDS}/k_{HDO}$, assuming a first order reaction with respect to the sulphur-containing compounds for the hydrodesulphurization reaction (HDS) and a first order reaction with respect to the olefins for the olefin hydrogenation reaction (HDO).

The values were normalized by taking catalyst 1 as the reference and $k_{HDS}/k_{HDO}=100$ and $k_{HDS}=100$.

TABLE 1

| characteristics of FCC gasoline cut | |
|---|---|
| S, ppm | 635 |
| Aromatics, wt % | 34.5 |

TABLE 1-continued

| characteristics of FCC gasoline cut | |
|---|---|
| Paraffins and naphthenes (wt %) | 39.5 |
| Olefins, wt % | 26.0 |
| IP, ° C. | 40 |
| EP, ° C. | 246 |

Example 1

In Accordance with the Invention

The catalysts of the invention were prepared using the procedure described above and their characteristics (density in grams of molybdenum oxide per square metre of support, amounts of oxides of cobalt, molybdenum and phosphorus in the calcined catalyst, the P/Mo molar ratio, BET surface area of support) are shown in Table 2. The $k_{HDS}/k_{HDO}$ selectivities and hydrodesulphurization activity $k_{HDS}$ obtained for the closed reactor model feed are also shown in this Table.

All of the catalysts were in accordance with the present invention and had an activity ($k_{HDS}$, normalized value) of 71 or more and a selectivity ($k_{HDS}/k_{HDO}$, normalized value) of 110 or more.

TABLE 2 characteristics and performances of catalysts of the invention on model feed

| Catalyst | Density, g $MoO_3/m^2$/ | CoO, wt % | $MoO_3$, wt % | $P_2O_5$, Wt % | P/Mo Mol/mol | S BET of support, $m^2/g$ | $k_{HDS}/k_{HDO}$ | $k_{HDS}$ |
|---|---|---|---|---|---|---|---|---|
| 1 (ref) | $7.6 \times 10^{-4}$ | 2.9 | 10.3 | 0 | 0 | 135 | 100 | 100 |
| 2 | $12.4 \times 10^{-4}$ | 2.1 | 10.1 | 1.3 | 0.27 | 81 | 119 | 110 |
| 3 | $13.4 \times 10^{-4}$ | 2.1 | 10.8 | 4.7 | 0.87 | 81 | 134 | 73 |
| 4 | $9.5 \times 10^{-4}$ | 1.4 | 7.7 | 2.0 | 0.53 | 81 | 133 | 92 |
| 5 | $3.9 \times 10^{-4}$ | 0.6 | 3.2 | 1.5 | 0.93 | 81 | 129 | 74 |
| 6 | $3.6 \times 10^{-4}$ | 0.6 | 3.0 | 0.4 | 0.25 | 81 | 110 | 71 |

Example 2

Comparative

In this example, the molar ratio P/Mo was not in accordance with the invention.

Table 3 summarizes the characteristics of the catalysts as well as the selectivities and activities obtained.

TABLE 3 characteristics and performances of comparative catalysts on model feed

| Catalyst | Density, g $MoO_3/m^2$/ | CoO, wt % | $MoO_3$, wt % | $P_2O_5$, Wt % | P/Mo Mol/mol | S BET of support, $m^2/g$ | $k_{HDS}/k_{HDO}$ | $k_{HDS}$ |
|---|---|---|---|---|---|---|---|---|
| 7 | $3.9 \times 10^{-4}$ | 1.1 | 3.1 | 0 | 0 | 81 | 99 | 71 |
| 8 | $3.7 \times 10^{-4}$ | 0.6 | 3.0 | 0.2 | 0.16 | 81 | 108 | 71 |

Example 3

Comparative

Catalyst 9 was not in accordance with the invention because the molybdenum density was too high. Table 4 provides its characteristics as well as its activity and selectivity.

TABLE 4 characteristics and performances of comparative catalysts on model feed

| Catalyst | Density, g $MoO_3/m^2/$ | CoO, wt % | $MoO_3$, wt % | $P_2O_5$, Wt % | P/Mo Mol/mol | S BET of support, $m^2/g$ | $k_{HDS}/k_{HDO}$ | $k_{HDS}$ |
|---|---|---|---|---|---|---|---|---|
| 9 | $19.5 \times 10^{-4}$ | 3.3 | 15.8 | 3.8 | 0.48 | 81 | 130 | 66 |

Example 4

Test on Real Feed

The catalysts shown in Table 5 were tested on a real feed in a traversed bed. The temperature indicated in Table 5 was adjusted to obtain a hydrodesulphurization conversion of close to 94%.

Catalysts 1 and 8, which contained little or no phosphorus, were not in accordance with the present invention. They had low selectivities, while catalysts 6 and 10, which were in accordance with the invention, had the best selectivities.

TABLE 5 characteristics and performances tested on fluid catalytic cracking gasoline

| Catalyst | Density, g $MoO_3/m^2/$ | CoO, wt % | $MoO_3$, wt % | $P_2O_5$, wt % | P/Mo mol/mol | S BET of support, $m^2/g$ | In acc. | T, °C. | $k_{HDS}/k_{HDO}$ |
|---|---|---|---|---|---|---|---|---|---|
| 1 (reference) | $7.6 \times 10^{-4}$ | 2.9 | 10.3 | 0 | 0 | 135 | No | 265 | 100 |
| 10 | $12.6 \times 10^{-4}$ | 2.2 | 10.2 | 2.8 | 0.55 | 81 | Yes | 270 | 173 |
| 6 | $3.6 \times 10^{-4}$ | 0.6 | 3.0 | 0.4 | 0.25 | 81 | Yes | 275 | 128 |
| 8 | $3.7 \times 10^{-4}$ | 0.6 | 3.0 | 0.2 | 0.16 | 81 | No | 275 | 103 |

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/07057, filed Jul. 28, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst comprising at least one support, at least one group VIII element, at least one group VIB element and phosphorus, in which the density of group VIB elements per unit surface area of the support is in the range of (limits included) $2\times10^{-4}$ to $18\times10^{-4}$ grams of oxides of group VIB elements per $m^2$ of support, in which the molar ratio of phosphorus to the group VIB element is in the range of 0.27 to 2.00, and in which the amount of group VIB elements is in the range of (limits included) 1% to 20% by weight of oxides of group VIB elements and in which the support has a specific surface area of less than 135 $m^2/g$, and in which the phosphorus content is in the range of (limits included) 0.1% to 10% by weight of $P_2O_5$.

2. A catalyst according to claim 1, in which the amount of group VIII elements in the catalyst is in the range of (limits included) 0.1% to 20% by weight of the group VIII element oxides.

3. A catalyst according to claim 1, in which the group VIB element or elements comprises molybdenum and/or tungsten.

4. A catalyst according to claim 3, in which the group VIII element or composite is selected from nickel and/or cobalt.

5. A catalyst according to claim 1, in which the group VIII element or elements comprises nickel and/or cobalt.

6. A catalyst according to claim 1, in which the support comprises a porous solid selected from aluminas, silica, silica alumina or from magnesium or titanium oxides used alone or as a mixture with alumina or silica alumina.

7. A catalyst according to claim 1, in which the catalyst support comprises at least 51% by weight of transition alumina.

8. A catalyst according to claim 1, in which the group VIB element is molybdenum, the group VIII element is cobalt, the molybdenum density per unit surface area of support is in the range of (limits included) $3\times10^{-4}$ to $14\times10^{-4}$ grams of molybdenum oxides per $m^2$ of support, the molar ratio of phosphorus to molybdenum is in the range of (limits included) 0.27 to 2.00, the molybdenum content is in the range of (limits included) 1% to 20% by weight of oxides of molybdenum, the cobalt content is in the range of (limits included) 0.3% to 5% by weight of cobalt oxides, the phosphorus content is in the range of (limits included) 0.2% to 5% by weight of $P_2O_5$, the catalyst support comprises at least 90% by weight of transition alumina and the support has a specific surface area of less than 135 $M^2/g$.

9. A catalyst according to claim 8, wherein the molar ratio of phosphorous to molybdenum is in the range of (limits included) 0.35 to 1.40.

10. A catalyst according to claim 8, wherein the molar ratio of phosphorous to molybdenum is in the range of (limits included) 0.45 to 1.10.

11. A catalyst according to claim 8, wherein the molar ratio of phosphorous to molybdenum is in the range of (limits included) 0.45 to 1.00.

12. A catalyst according to claim 8, wherein the molar ratio of phosphorous to molybdenum is in the range of (limits included) 0.50 to 0.95.

13. A catalyst according to claim 8, containing 0.3% to 4% by weight of $P_2O_5$.

14. A catalyst according to claim 8, containing 0.35% to 3% by weight of $P_2O_5$.

15. A catalyst according to claim 1, wherein the molar ratio of phosphorous to the group VIB element is in the range of (limits included) 0.35 to 1.40.

16. A catalyst according to claim 1, wherein the molar ratio of phosphorous to the group VIB element is in the range of (limits included) 0.45 to 1.10.

17. A catalyst according to claim 1, wherein the molar ratio of phosphorous to the group VIB element is in the range of (limits included) 0.45 to 1.00.

18. A catalyst according to claim 1, wherein the molar ratio of phosphorous to the group VIB element is in the range of (limits included) 0.50 to 0.95.

19. A catalyst according to claim 1, containing 0.2% to 5% by weight of $P_2O_5$.

20. A catalyst according to claim 1, containing 0.3% to 4% by weight of $P_2O_5$.

21. A catalyst according to claim 20, wherein the specific surface of the support is less than 100 $m^3/g$.

22. A catalyst according to claim 20, wherein the specific surface of the support is less than 85 $m^3/g$.

23. A catalyst according to claim 1, containing 0.35% to 3% by weight of $P_2O_5$.

24. A catalyst according to claim 1, wherein the specific surface of the support is less than 100 $m^3/g$.

25. A catalyst according to claim 1, wherein the specific surface of the support is less than 85 $m^3/g$.

26. A process for hydrodesulphurizing a gasoline cuts feed in the presence of a catalyst according to claim 1.

27. A process according to claim 26, in which the feed to be hydrodesulphurized comprises a gasoline cut containing sulphur derived from a coking unit, visbreaking unit, steam cracking unit or catalytic cracking unit.

28. A process according to claim 26, in which the feed for hydrodesulphurization comprises a gasoline cut derived from a catalytic cracking unit the boiling point range of which extends from the boiling points of hydrocarbons containing 5 carbon atoms to about 250° C.

29. A process according to claim 26, in which the hydrodesulphurization operating conditions are a temperature in the range of 200° C. to 400° C., a total pressure in the range of 1 MPa to 3 MPa, and a ratio of the volume of hydrogen per volume of hydrocarbon feed in the range of 100 to about 600 litres per litre.

30. A process for hydrodesulphurizing gasoline cuts in the presence of a catalyst according to claim 2.

31. A process for hydrodesulphurizing gasoline cuts in the presence of a catalyst according to claim 3.

32. A process for hydrodesulphurizing gasoline cuts in the presence of a catalyst according to claim 3.

33. A process for hydrodesulphurizing gasoline cuts in the presence of a catalyst according to claim 5.

34. A process for hydrodesulphurizing gasoline cuts in the presence of a catalyst according to claim 6.

35. A process for hydrodesulphurizing gasoline cuts in the presence of a catalyst according to claim 7.

36. A process for hydrodesulphurizing gasoline cuts in the presence of a catalyst according to claim 8.

* * * * *